ns of the pitmans 18
United States Patent Office 2,717,690
Patented Sept. 13, 1955

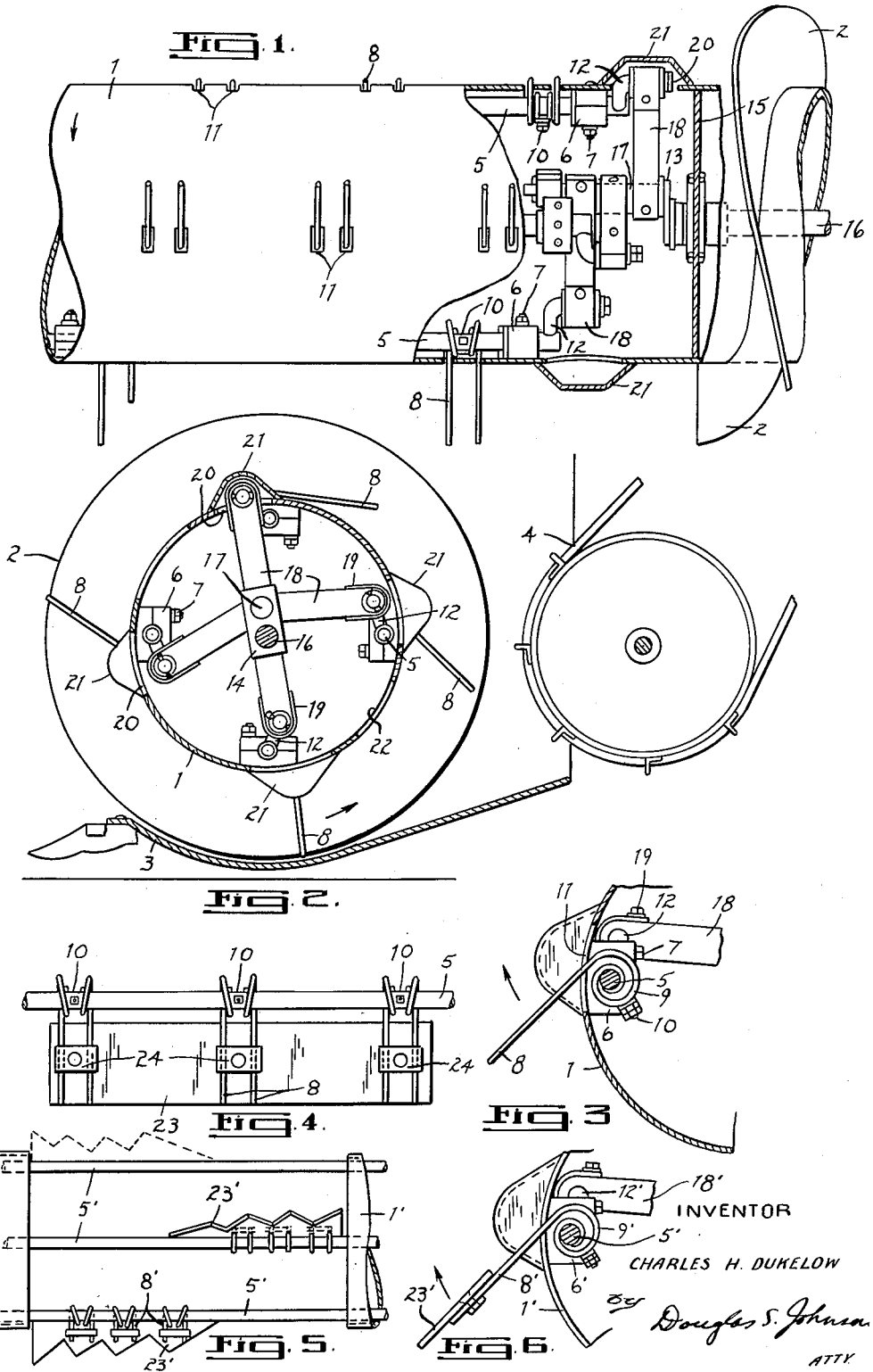

2,717,690

ROCKING SPRING FINGER MECHANISM

Charles H. Dukelow, Toronto, Ontario, Canada

Application June 27, 1951, Serial No. 233,754

Claims priority, application Canada July 4, 1950

8 Claims. (Cl. 198—211)

This invention relates to improvements in feed mechanisms for delivering grain from the table to the elevator leading to the threshing cylinder in a threshing machine, combine or the like, and more particularly to an improved auger feed mechanism.

The principal object of the invention is to provide a finger arrangement on the auger which will give improved and more efficient feed from the table to the elevator.

A further important object is to eliminate the high incidence of finger breakage due to foreign objects in the grain occurring with present augers.

A still further object is to provide for increased facility of assembly and replacement of the fingers.

The principal feature of the invention resides in rockably supporting a plurality of spring fingers or elements in a novel manner immediately in advance of the elevator to be bodily revolved by the auger cylinder and providing a crank arrangement to rock the fingers under auger rotation about axes fixed relative the auger cylinder and parallel the axis thereof from a radially extending position during the lower portion of their cycle of movement adjacent the table past the elevator and through to a position substantially tangentially of the cylinder at the upper portion of their cycle of movement diametrically above the table.

The spring fingers or elements may be conveniently located within the auger cylinder and another and important feature consists in forming the spring fingers as resilient wire forks having spirally coiled bases anchored to rock shafts and having convolutions of increasing radius encircling their rock shafts whereby the fingers are enabled to wind into and out of the auger cylinder in riding over foreign objects without snapping at the base.

Still another feature resides in bridging a plurality of the spring fingers with a transverse grain sweeping element.

These and other objects and features will be apparent from the description in conjunction with the accompanying drawings in which, Figure 1 is an elevational view of a central portion of an auger equipped with rocking spring fingers in accordance with the invention, parts of the auger being broken away for clarity.

Figure 2 is a transverse vertical sectional view through the auger and showing its relation relative the elevator mechanism it feeds.

Figure 3 is a fragmentary vertical sectional detail through the cylinder illustrating the rocking finger construction.

Figure 4 is an elevational detail of a group of fingers bridged by belt webbing for the picking up of short grain.

Figure 5 is a side elevation of an alternative form of the invention.

Figure 6 is a fragmentary vertical section illustrating the rocking element of Figure 5.

The augers used in threshing machines, combines and the like act to deliver grain to a central point where a central delivery is effected either through flexible paddles in the older machines or disappearing fingers in present machines which deliver the grain onto the elevator. The old type paddle arrangements provide very ineffective delivery and the present disappearing fingers, while affording improved delivery are subject to breakage, and still do not produce entire satisfactory delivery. Additionally, the disappearing type fingers are difficult to install and replace upon breakage and render the machine inoperative for long periods during repair or replacement.

The present invention overcomes the disadvantages of previous type fingers.

With reference to the drawings, 1 represents the hollow rotatable cylinder of an auger provided with the spiral flange 2 to feed the grain inwardly to the central portion of the table 3, Figure 2, of a threshing machine or the like provided with the elevator 4 leading to the threshing cylinder not shown.

Journalled within the cylinder 1 in peripherally spaced relation are a plurality of rock shafts 5 having their journals 6 anchored to the cylinder by bolts 7.

Mounted on each of these rock shafts is a plurality of spring fingers 8 formed of spring wire into a fork portion defining the fingers 8 and the spirally coiled base portion having the convolutions 9 of increasing radius and circling the rock shaft to which the particular finger is anchored by means of the clamp 10.

The fingers 8 project through slots 11 is the periphery of the cylinder, and it will be noted that they extend substantially tangential to the rock shaft to which they are secured and are free to swing upon rocking of their rock shaft between a position extending radially of the cylinder at the lowermost point of their cycle of movement, Figure 2, to a position substantially tangential of the cylinder at the uppermost point of travel in their cycle of movement.

The tangential arrangement of the fingers on their rock shafts and the increasing radius of their convolutions 9 permits this movement from radially of the cylinder to tangentially of the cylinder with the rock shafts located within the cylinder and with a minimum length of slot 11, and also it will be seen that the increasing radius of the convolutions 9 permits the fingers to wind out of and into these slots 11 to permit excessive movement upon striking a foreign object.

Each of the rock shafts 5 is provided with a crank 12 while arranged within the cylinder is a stationary crank 13 supported in the bearing 14 mounted in a partition 15 in the cylinder, and this stationary crank has a shaft extension 16 extending to the end of the cylinder 1 and an offset crank extension 17 eccentric to the axis of the cylinder.

Connected between the cranks 12 of the rock shafts and the eccentric offset crank portion 17 are pitmans 18 which may suitably be formed of wood and reinforced at the ends by the metal straps 19.

The axially extending shaft portion 16 of the stationary crank permits adjustment of the position of the eccentric crank portion 17 to control the position and angle of the fingers 8 under rotation of the cylinder 1 by the normal drive means (not shown).

Figure 2 illustrates the desired position of the stationary crank so that the pitmans 18 through the cranks 12 will rotate the fingers into the angular positions of Figure 2 previously described, the lower radially extending position serving to ensure that the grain is fed rearwardly and upwardly to the elevator 4 while the increasing lagging of the fingers as they rotate up past the elevator through to the upper tangential position ensures that the grain is not carried beyond the elevator.

To accommodate the movement of the pitmans 18 the cylinder 1 is provided with slots 20, preferably closed by the hoods 21, and the walls of the cylinder are provided with openings 22 through which operator can gain access to the finger clamps 10 or journals 6 of the rock shafts 5 to afford ready installation and servicing and replacement of these parts.

The convenience of installation and maintenance is particularly desirable and eliminates the necessity of laying the machine up for any extended period for finger replacement.

The rocking action affords a particularly desirable feed in that the grain is positively advanced from the table, and due to the particular construction of the fingers the actual length of the fingers is increasing as the grain is lifting towards the elevator, yet at the same time the fingers are inclining from the radial towards the tangential to prevent the grain from being swept past the elevator.

This effective increase in length of the fingers in direct opposition to the action of the disappearing finger auger results from the coiled arrangement forming the base of the fingers. Further, in the event the fingers encounter a foreign obstacle they are free, not only to yield through their own resiliency but they wind about their rock shafts to displace and pass over the object, merely tightening their convolutions in the passage. This is an important distinction from prior finger arrangements and very markedly eliminating the high incidence of present finger breakage.

Where a particularly short grain is to be delivered the fingers 8 may have spanned therebetween belt webbing 23 maintained in position by clamps 24. The addition of the belt webbing in no way detracts from the resiliency of the fingers nor their ability to wind into and out of their slots in riding over foreign objects.

In the alternative form of the invention as seen in Figures 5 and 6, the feed auger is shown as two separated auger cylinders 1' and spanned between these cylinders are rock shafts 5' having their journals 6' anchored to the cylinders 1' and rotating therewith.

The grain sweeping elements of this modification comprise the supporting finger bases 8' similar to the fingers 8 with convolutions 9' of increasing radius.

Secured between spaced finger bases 8' are grain sweeping teeth 23' tapering in height towards the centre of the space between the cylinders 1'. The teeth 23' are staggered on shafts 5' and overlap at their inner reduced ends.

The shafts 5' are rocked in the same manner as the shaft 5 upon rotation of the auger cylinders by means of a crank 12', end pitman 13' and stationary crank (not shown).

With this arrangement the same rocking action is afforded the teeth 23' as the fingers 8, while a wide swath of grain may be delivered to the elevator 4 with the teeth being shaped and constituted to further advance the grain longitudinally of the table 3 to the immediate centre of the elevator 4.

It will be understood that various other modifications and alterations in the specific structure set forth herein may be made without departing from the scope of the appended claims.

What I claim as my invention is:

1. In an auger feed mechanism, a hollow rotatable cylinder, a plurality of spring fingers supported to rock on axes arranged within and fixed relative to and parallel the axis of said cylinder, said fingers projecting outwardly through slots formed in the wall of said cylinder, and crank means arranged within said cylinder and rocking said fingers with a predetermined positively actuated movement at all times upon rotation of said cylinder between a position extending radially from said cylinder at the lower portion of their cycle of movement to a position substantially tangential to the cylinder at the upper portion of their cycle of movement.

2. In a grain feeding mechanism or the like, a hollow rotatable cylinder, a plurality of rock shafts journalled within said cylinder adjacent the periphery thereof, a plurality of spring fingers formed with coiled bases having convolutions of increasing radii anchored to said rock shafts and projecting through the periphery of said cylinder and extending substantially tangential of said rock shafts and extensible relative to said rock shafts upon change of radii of said convolutions, and crank means arranged within said cylinder and rocking said shafts upon rotation of said cylinders to actuate said fingers between a position extending radially from said cylinder at the lower portion of their cycle of movement to a position substantially tangential to the cylinder at the upper portion of their cycle of movement.

3. In an auger feed mechanism, comprising a hollow rotatable auger cylinder, a plurality of forked spring fingers rockably supported within said cylinder to project in the slots through the periphery thereof and formed with spirally coiled bases with convolutions of increasing radius terminating in said fingers, means for rocking said fingers upon rotation of said cylinder between a position substantially radially of said cylinder to a position substantially tangential of said cylinder, said coiled bases with convolutions of increasing radii permitting said fingers extensible movement through said slots in yielding under a load sufficient to coil said convolutions to decrease the radii thereof.

4. In a threshing machine or the like having a grain-receiving table disposed transversely of a grain elevator and in advance thereof and auger feed means extending longitudinally of said table for advancing grain towards said grain elevator, a plurality of rock shafts carried by said auger feed means and extending transversely across the mouth of said elevator means, a plurality of grain-engaging elements carried by said rock shafts, said grain-engaging elements having spirally coiled spring bases secured to said rock shafts and encircling same with convolutions of increasing radii to provide an extensibility to said elements under loading, a crank connected with said rock shafts, a stationary crank, and means connecting said cranks together to rock said shafts and elements upon rotation of auger means between a position with said elements extending substantially radially of their path of travel when moving adjacent the table and towards the elevator and a position substantially tangentially of their path of travel when moving past and away from the elevator.

5. In an auger feed mechanism, a hollow rotatable auger cylinder, a plurality of rock shafts journalled within said cylinder adjacent the periphery and extending parallel the axis thereof, a plurality of grain-engaging elements comprising forked fingers each branch of which has a coiled base secured to said rock shafts with the bases of at least two branches being integral, said fingers projecting through the periphery of said cylinder and extending substantially tangentially of their rock shafts, cranks secured to said rock shafts to at all times control the movement thereof, an eccentric stationary crank shaft within said cylinder, and pitmans connecting said cranks with said crank shaft.

6. A device as claimed in claim 5 in which the eccentricity of said stationary crank shaft is adjustable through a shaft extension journalled co-axially of said cylinder, said shaft extension being rotatable to move said eccentric crank shaft in an adjustment arc.

7. In an auger feed mechanism, an auger feed cylinder, a plurality of rock shafts carried by said auger feed cylinder and extending parallel to the axis thereof, a plurality of grain-engaging elements carried by said rock shafts, said grain-engaging elements comprising a longitudinal spring element bent intermediate its length into a series of coils forming a coiled base for mounting on said rock shafts, and a pair of spring fingers extending from the base, cranks secured to said rock shafts, an eccentric stationary crank shaft and pitman connecting said cranks with said crank shaft.

8. A device as claimed in claim 7 in which a central coil of each of said bases is of smaller radii than the coils which connect said arms to the base.

References Cited in the file of this patent

UNITED STATES PATENTS

| | | |
|---|---|---|
| 1,170,616 | Dintaman | Feb. 8, 1916 |
| 1,287,593 | Rodemeyer | Dec. 10, 1918 |
| 1,409,695 | French | Mar. 14, 1922 |
| 2,497,409 | Jones | Feb. 14, 1950 |
| 2,529,180 | Oehler | Nov. 7, 1950 |
| 2,608,283 | Oehler | Aug. 26, 1952 |